US010245965B2

(12) United States Patent
Stewing et al.

(10) Patent No.: US 10,245,965 B2
(45) Date of Patent: Apr. 2, 2019

(54) TRANSMISSION COIL FOR THE INDUCTIVE TRANSFER OF ENERGY

(71) Applicant: Robert Bosch GmbH, Stuttgart (DE)

(72) Inventors: Felix Stewing, Steinheim (DE); Tobias Diekhans, Stuttgart-Vaihingen (DE)

(73) Assignee: Robert Rosch GmbH, Stuttgart (DE)

( * ) Notice: Subject to any disclaimer, the term of this patent is extended or adjusted under 35 U.S.C. 154(b) by 66 days.

(21) Appl. No.: 15/509,980

(22) PCT Filed: Jul. 15, 2015

(86) PCT No.: PCT/EP2015/066126
§ 371 (c)(1),
(2) Date: Mar. 9, 2017

(87) PCT Pub. No.: WO2016/037737
PCT Pub. Date: Mar. 17, 2016

(65) Prior Publication Data
US 2017/0259677 A1 Sep. 14, 2017

(30) Foreign Application Priority Data
Sep. 10, 2014 (DE) .................... 10 2014 218 067

(51) Int. Cl.
*H02J 7/00* (2006.01)
*B60L 11/18* (2006.01)
(Continued)

(52) U.S. Cl.
CPC ......... *B60L 11/1825* (2013.01); *B60L 11/182* (2013.01); *H01F 27/24* (2013.01);
(Continued)

(58) Field of Classification Search
CPC ....................................................... H02J 7/025
(Continued)

(56) References Cited

U.S. PATENT DOCUMENTS

| 4,590,453 A | 5/1986 | Weissman |
| 6,175,212 B1 | 1/2001 | Oguri |

(Continued)

FOREIGN PATENT DOCUMENTS

| CN | 101454957 A | 6/2009 |
| DE | 102007023343 | 12/2007 |

(Continued)

OTHER PUBLICATIONS

International Search Report for Application No. PCT/EP2015/066126 dated Sep. 29, 2015 (English Translation, 3 pages).

*Primary Examiner* — Yalkew Fantu
(74) *Attorney, Agent, or Firm* — Michael Best & Friedrich LLP

(57) ABSTRACT

The invention relates to a transmission coil (10) configured for inductive energy transfer, comprising a carrier (17), a coil arrangement (11) having a plurality of turns (12), and a capacitance. It is thereby provided that the capacitance is formed of a plurality of capacitors (22), wherein each capacitor (22) is assigned to an individual turn (12) or to a group of at least two turns (12) of the coil arrangement (11), and together with the coil arrangement, the capacitors (22) are arranged on the carrier (17). The invention further relates to a stationary charging station and to a vehicle, each comprising such a transmission coil (10), and to a system for the inductive charging of vehicles. No drawing text to be translated.

17 Claims, 3 Drawing Sheets

(51) Int. Cl.

| | | |
|---|---|---|
| *H01F 38/14* | (2006.01) | |
| *H02J 7/02* | (2016.01) | |
| *H01F 27/36* | (2006.01) | |
| *H01F 27/40* | (2006.01) | |
| *H02J 50/12* | (2016.01) | |
| *H01F 27/24* | (2006.01) | |
| *H01F 27/28* | (2006.01) | |

(52) U.S. Cl.
CPC .......... *H01F 27/28* (2013.01); *H01F 27/288* (2013.01); *H01F 27/2876* (2013.01); *H01F 27/362* (2013.01); *H01F 27/40* (2013.01); *H01F 38/14* (2013.01); *H02J 7/0027* (2013.01); *H02J 7/025* (2013.01); *H02J 50/12* (2016.02); *B60L 2230/00* (2013.01); *Y02T 10/7005* (2013.01); *Y02T 10/7088* (2013.01); *Y02T 90/122* (2013.01); *Y02T 90/14* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 2002/0089305 | A1* | 7/2002 | Park ...................... | H02J 50/10 |
| | | | | 320/108 |
| 2007/0182367 | A1* | 8/2007 | Partovi ................... | H01F 5/003 |
| | | | | 320/108 |
| 2009/0096413 | A1* | 4/2009 | Partovi ................... | H01F 5/003 |
| | | | | 320/108 |
| 2010/0207771 | A1* | 8/2010 | Trigiani .............. | B60L 11/1816 |
| | | | | 340/636.1 |
| 2011/0187318 | A1* | 8/2011 | Hui .......................... | H02J 7/00 |
| | | | | 320/108 |
| 2012/0256585 | A1* | 10/2012 | Partovi et al. ......... | H01M 10/44 |
| | | | | 320/108 |

FOREIGN PATENT DOCUMENTS

| | | |
|---|---|---|
| DE | 102011077709 | 12/2012 |
| DE | 102012202472 | 8/2013 |
| EP | 1705673 | 9/2006 |
| EP | 2555376 | 2/2013 |

\* cited by examiner

TRANSMISSION COIL FOR THE INDUCTIVE TRANSFER OF ENERGY

BACKGROUND OF THE INVENTION

The invention relates to a transmission coil which is configured to inductively transfer energy, comprising a carrier, a coil arrangement with a multiplicity of turns, and a capacitance which forms, together with the coil arrangement, an oscillatory circuit. Further aspects of the invention relate to a fixed charging station and to a vehicle, each comprising such a transmission coil, and to a system for inductively charging vehicles comprising a fixed charging station and a vehicle.

Various systems for the contactless transfer of energy are known for conveniently charging electrical energy stores. Depending on the configuration, these systems can be used, for example, for charging consumer electronics such as, for example, cell phones or MP3 players or for charging electrically driven vehicles. Electrically driven vehicles comprise, for example, industrial trucks which are used for transporting goods in a warehouse, hybrid vehicles which have both an electric drive and an internal combustion engine, and purely electrically powered motor vehicles.

DE 20 2011 077 709 A1 discloses an arrangement for transmitting electrical energy, in particular for charging an energy store of a mobile carrier, in particular of a motor vehicle. The arrangement comprises an electromagnetic transmission unit which is formed by two transmission elements which are embodied as coils. One of the coils is assigned here to the motor vehicle, and the other is assigned to a charging station. Each coil is assigned a capacitor, wherein in each case a capacitor with a coil forms a resonant circuit. Furthermore, the arrangement comprises rectifiers, power inverters and a PFC (Power Factor Correction) circuit. The PFC circuit permits, inter alia, reactive power to be compensated. Using the reactive power compensation, it is also possible to transmit the energy with a high level of efficiency even in the case of a relatively weak inductive coupling.

A disadvantage of the prior art is that in addition to the transmission coils a multiplicity of separate components are also required.

SUMMARY OF THE INVENTION

A transmission coil is proposed which is configured to inductively transfer energy, comprising a carrier, a coil arrangement with a multiplicity of turns, and a capacitance. There is provision here that the capacitance is formed by a multiplicity of capacitors, wherein each capacitor is assigned to an individual turn or a group of at least two turns of the coil arrangement, and the capacitors are arranged, together with the coil arrangement, on the carrier.

Transmission coils are required for the inductive transmission of electrical energy, wherein a primary transmission coil is arranged in a charging station, and a secondary transmission coil is assigned to a mobile energy store which is to be charged. In order to transmit energy, the primary coil is excited with an alternating voltage, as a result of which an alternating magnetic field is produced in the region of the primary transmission coil. If the secondary transmission coil is moved into the vicinity of the primary transmission coil, with the result that the magnetic field of the primary transmission coil flows through said secondary transmission coil, an electric current is induced in the secondary transmission coil.

For an efficient transmission of energy, oscillatory circuits are formed from a coil arrangement with a multiplicity of turns and a capacitance. The oscillatory circuit is excited with an alternating voltage which is generated by power electronics. In this context, it has been customary hitherto that the power electronics and the capacitance which is necessary to form the oscillatory circuit are arranged spatially separate from the coil arrangement. In this context, the capacitance is usually formed by one or a small number of capacitors with a high capacitance and is assigned in its entirety to the coil arrangement.

In contrast, in the case of the transmission coil according to the invention there is provision to use a multiplicity of capacitors instead of a single capacitance which is assigned to the entire coil arrangement, wherein each capacitor is assigned to an individual turn or to a group of at least two turns of the coil arrangement. In the case of turns which are combined to form groups, the coil arrangement comprises a multiplicity of such groups. In this context, each individual capacitor or each individual capacitance is, considered per se, respectively considerably smaller than the entire capacitance assigned to the coil arrangement. As a result, the installation space which is required for each individual capacitor of the capacitors also turns out to be significantly smaller, which permits the individual capacitors to be arranged jointly on a carrier, together with the coil arrangement.

The carrier holds both the coil arrangement and the capacitors which are assigned to the individual turns or groups of turns and secures them mechanically. The carrier is preferably embodied as a metal plate whose external shape essentially follows the shape of the coil arrangement. A metal such as, for example, aluminum is preferably used as the material, wherein the turns of the coil arrangement are electrically insulated from the carrier.

A group of turns usually comprises between 2 and 20 turns, and the entire coil arrangement usually comprises between 4 and 200, preferably between 10 and 100 turns.

In a further embodiment of the invention, there is also provision that, furthermore, power electronics, which comprise a power inverter and/or a rectifier and/or further circuit components (e.g. microcontroller for controlling the charging sequence), are arranged on the carrier.

In this embodiment, all of the components which are required for the transmission of energy are integrated together with the respective transmission coil to form one unit. If a transmission coil is embodied, for example, as a primary transmission coil, in particular a rectifier, a power inverter, the coil arrangement with the multiplicity of turns as well as the capacitors which are assigned to the individual turns or individual groups of turns are arranged on the carrier.

If the transmission coil is embodied as a secondary transmission coil, for example a rectifier, the coil arrangement with the multiplicity of turns or groups or turns and the respective capacitors are arranged on the carrier.

The transmission coil according to the invention requires no further external components for its operation. The primary transmission coil only then needs to be connected to a power supply system for the supply of energy. The secondary transmission coil then only needs to be connected to the electric energy store which is to be charged.

In one variant of the transmission coil according to the invention, the power electronics are configured to deactivate or activate individual turns or individual groups of turns of the coil arrangement.

Since each individual turn of the coil arrangement or each group of turns is assigned a separate capacitance in the form of a capacitor, each turn or group of turns constitutes, considered per se, an independent oscillatory circuit. This permits individual turns or groups of turns to be deactivated, and not included in the transmission of energy, without further compensating measures. This can be utilized, for example, to influence the shape of the magnetic field generated by the transmission coil or to produce various turn conditions.

In one embodiment of the invention, the turns of the coil arrangement are arranged in the form of concentric circles or a spiral path on the carrier. A rectangular or square embodiment of the turns is also conceivable. In this context, the power electronics and/or the capacitors are preferably located in the center of the coil arrangement. Such an arrangement permits an extremely compact design of the transmission coil.

In one embodiment of the invention, the carrier is configured to serve as a shield for the electromagnetic compatibility (EMC).

In the power electronics, in particular in the case of a power inverter, alternating magnetic fields are produced which have to be shielded in order to avoid adversely affecting radio transmissions in the surroundings and the functioning of other electronic devices in the surroundings and in order to comply with legal requirements for the protection of persons against magnetic fields. An electrically conductive material is required for the shielding. If, for example, the carrier is configured in such a way that it surrounds the coil arrangement and the power electronics and the carrier is also fabricated from an electrically conductive material such as, for example, aluminum, the carrier can shield electromagnetic radiation which is produced.

In a further embodiment of the transmission coil, the carrier is configured in such a way that it serves as a heat sink for the capacitors and/or for the power electronics. For this purpose, a material which has good thermal conductivity is preferably selected for the carrier. Therefore, in particular aluminum and copper are suitable as materials, wherein aluminum is more cost-effective than copper and is therefore preferred.

In a further embodiment of the transmission coil there is provision that the carrier comprises ducts which are configured to have a cooling medium flowing through them. The cooling medium which is used can be, for example, a water-glycol mixture. Such an embodiment of the carrier is suitable, in particular, for conducting away the waste heat of the power electronics and of the capacitors. However excessive heating of the turns of the coil arrangement can also be avoided in this way.

In one embodiment of the transmission coil, said coil comprises more than one coil arrangement. In particular, the transmission coil can comprise two coil arrangements. In this context, the two coil arrangements can be connected to one another in such a way that the turns are connected in the same direction or in opposite directions.

A further aspect of the invention is making available a fixed charging station which is configured to charge vehicles in a wireless fashion, wherein the charging station comprises at least one or precisely one of the transmission coils described herein as a primary transmission coil.

Furthermore, a vehicle is made available which is configured to charge in a wireless fashion, wherein the vehicle comprises at least one or precisely one of the transmission coils described herein as a secondary transmission coil. The vehicle represents a mobile unit which can interact with a charging station.

Furthermore, a system is made available for inductively charging vehicles, which system is formed by a fixed charging station and a vehicle, wherein both the charging station and the vehicle comprise at least one or precisely one of the described transmission coils. In this context, in the system there is provision that the secondary transmission coil of the vehicle is moved temporarily into the vicinity of the primary transmission coil of the charging station, with the result that the magnetic field which is generated by the primary transmission coil flows through the secondary transmission coil. After the ending of the charging process, the vehicle can exit the charging station again, as a result of which the secondary transmission coil is removed from the region of the primary transmission coil.

The transmission coil is not limited to the use in conjunction with the inductive charging of vehicles. Depending on the configuration of the transmission coil, said coil can be used, in particular, to charge any mobile units with an energy store. Examples of this are the wireless charging of cell phones or of electrically powered tools. In this context, a primary transmission coil is assigned to a charging unit, and a secondary transmission coil is assigned to the mobile unit.

In the systems known from the prior art, the charging station and the mobile unit which interacts with the charging station comprise a multiplicity of separate discrete assemblies. In the case of the mobile unit which contains the secondary transmission coil, these are the coil arrangement, the capacitance, the rectifier and a radiator. In this context, every component must satisfy per se all the requirements made, for example, of the cooling or the shielding for the electromagnetic compatibility (EMC), as a result of which redundancies occur. These redundancies are avoided with the measures of the invention by means of a fully integrated design in which the transmission coil comprises, in addition to the coil arrangement, also the necessary capacitances and, if appropriate, the necessary power electronics, and in which the coil arrangement, the capacitance and, if appropriate, the necessary power electronics are arranged together on a carrier. This commonly used carrier equally satisfies the function of a mechanical carrier, of a shield and of a radiator for all the components which are accommodated. As a result, there is a saving in material without a restriction of the functionality, which reduces the required installation space, the weight and the costs of the transmission coil.

In addition there is provision to use, instead of a single capacitance which is assigned to the entire coil arrangement, a plurality of capacitors which are each assigned to an individual turn of the coil arrangement or to a group of turns of the coil arrangement. In this context, each turn or each group of turns is compensated individually by the respectively assigned capacitor. This permits, when necessary, individual turns or groups of turns to be deactivated without the need to perform additional measures to adapt the oscillatory circuit. Such deactivation of individual turns or of individual groups of turns permits, for example, the magnetic field generated by the primary transmission coil to be changed and to be adapted in optimum way to the respectively used secondary transmission coil or different turn conditions to be produced.

Furthermore, the compensation of individual turns or groups of turns provides the advantage that the maximum resonant voltages which occur can be significantly reduced. As a result, the expenditure on insulation and shielding can be lowered.

In addition, the arrangement of all the relevant components of a transmission coil on a common carrier facilitates the cooling. Only the common carrier then has to be cooled, and this is possible, for example, with liquid cooling or with air cooling. Moreover, by integrating all the relevant components it is possible to achieve a saving in terms of additional components such as, for example, plugs, clamped connections or additional housings.

In the following description of the figures, identical or similar components and elements are denoted by identical or similar reference symbols, wherein a repeated description of these components or elements will not be given in individual cases. The figures represent the subject matter of the invention only schematically.

DETAILED DESCRIPTION

Figure 1:
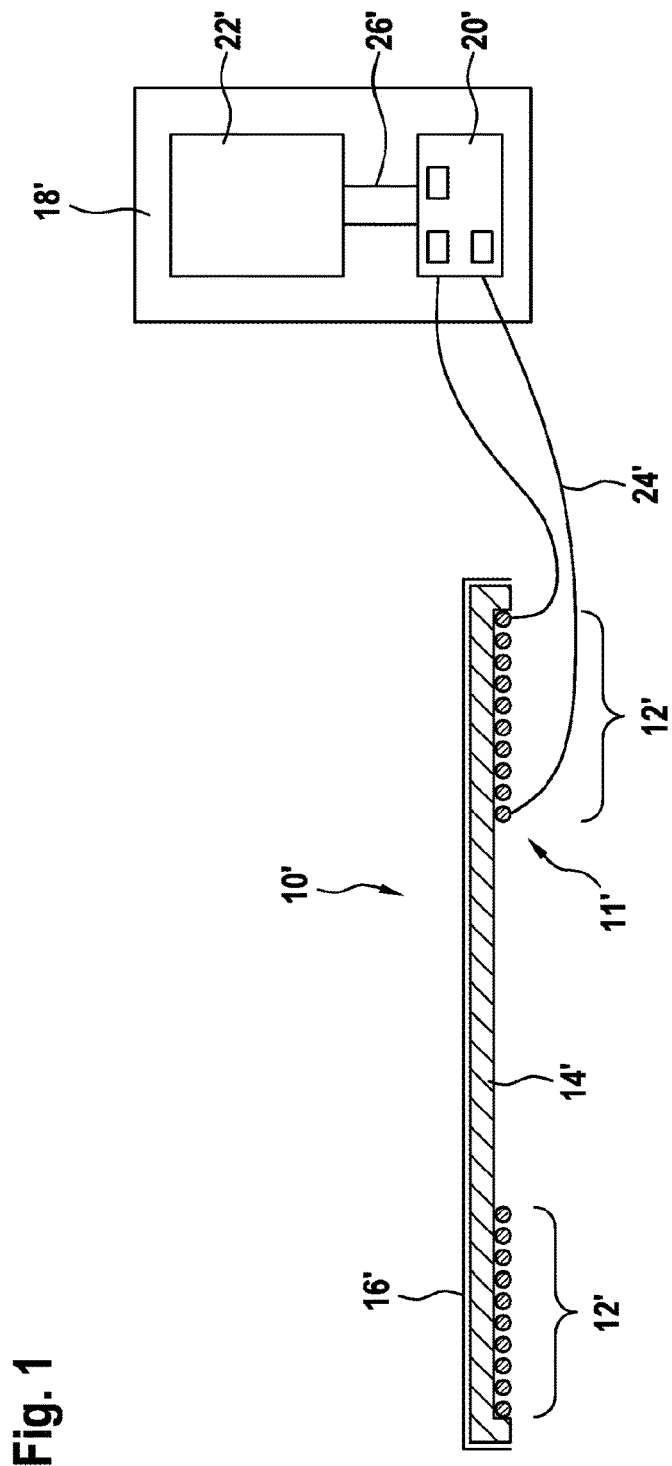
FIG. 1 shows a charging station with a primary transmission coil according to the prior art.

FIG. 1 shows a charging station with a transmission coil according to the prior art in a schematic illustration in a cross section from the side.

FIG. 1 illustrates a transmission coil 10' which comprises a coil arrangement 11' with a multiplicity of turns 12'. A ferrite element 14', which serves as a ferromagnetic core of the coil arrangement 11', is arranged around the turns 12'. The coil arrangement 11' is provided with an electrically conductive shield (e.g. aluminum) 16' in order to shield the magnetic stray field.

In order to generate a magnetic field, the coil arrangement 11' is connected to a switching cabinet 18' via a connecting line 24'. The switching cabinet 18' comprises power electronics 20' and a capacitor 22'. The capacitor 22' is connected to the coil arrangement 11' via a further connecting line 26', the power electronics 20' and the connecting line 24', wherein the coil arrangement 11' and the capacitor 22' together form an oscillatory circuit.

If the transmission coil 10' is embodied as a primary transmission coil, the oscillatory circuit is excited by means of the power electronics 20', with the result that an alternating magnetic field is produced. This alternating magnetic field can be converted again into electrical current by a correspondingly equipped secondary transmission coil. If the transmission coil 10' from FIG. 1 is embodied as a secondary transmission coil, the transmission coil 10' is moved into the vicinity of a primary transmission coil, with the result that the alternating magnetic field of the primary transmission coil flows through the secondary transmission coil. Owing to induction in the secondary transmission coil, the oscillatory circuit is excited and the electrical energy can be extracted by means of correspondingly configured power electronics 20', comprising a rectifier in this case. The electrical energy can then be used, for example, to charge an electrical energy store such as, for example, a battery or an accumulator. The electrical energy store can be assigned, in particular, to an electric vehicle or a hybrid vehicle.

Figure 2:
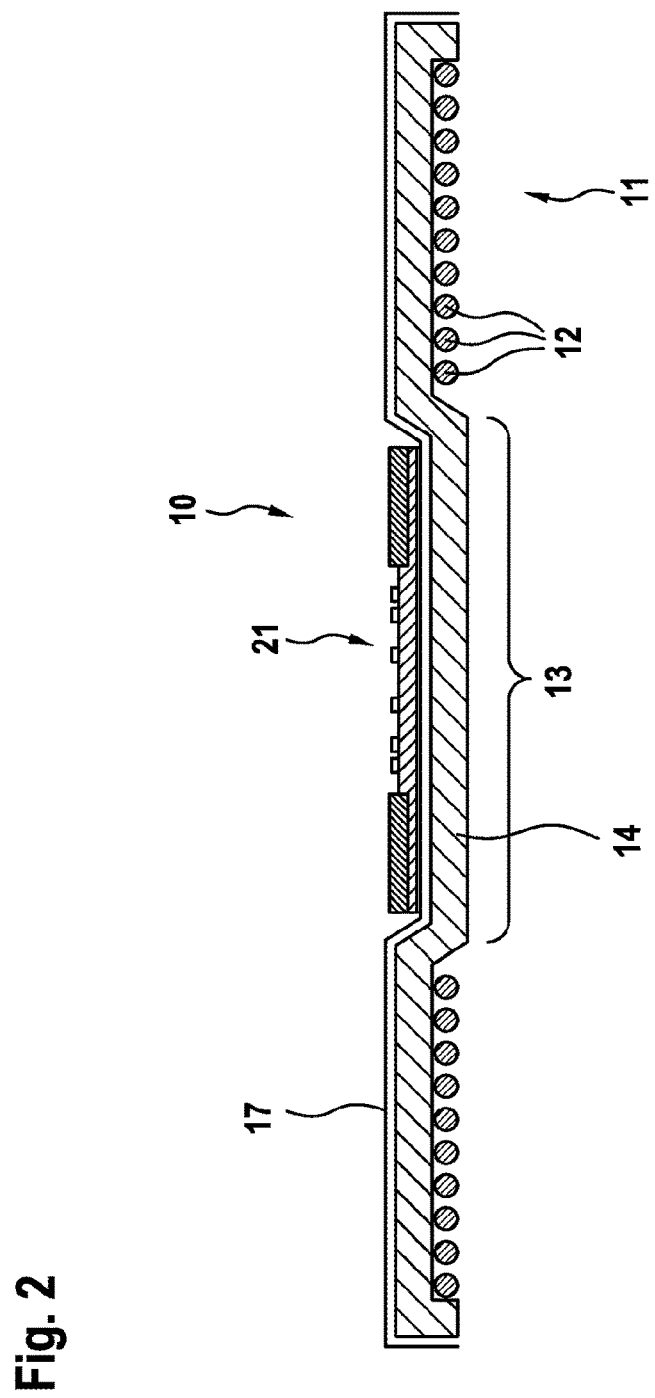
FIG. 2 shows a transmission coil according to the invention in a sectional view from the side.

FIG. 2 illustrates a transmission coil 10 according to the invention in a sectional illustration from the side.

The transmission coil 10 comprises a carrier 17, which is fabricated, for example, from aluminum. A coil arrangement 11, which comprises a multiplicity of turns 12 and a ferrite core 14, is accommodated in the carrier 17. The turns 12 of the coil arrangement 11 are wound around a central region 13 in a helical shape. In the central region 13, the carrier 17 forms a trough in which integrated electronics 21 are arranged. The integrated electronics 21 comprise further, preferably all of the further, components which are necessary for operating the transmission coil 10, in particular, for example, the power electronics and the resonant capacitance as described below with reference to FIG. 3. The capacitance is divided here into a large number of individual capacitors which are each assigned to an individual turn 12 or a group of turns 12. In this context, in each case a capacitor forms, together with a turn 12 or a group of turns 12, an oscillatory circuit.

Figure 3:
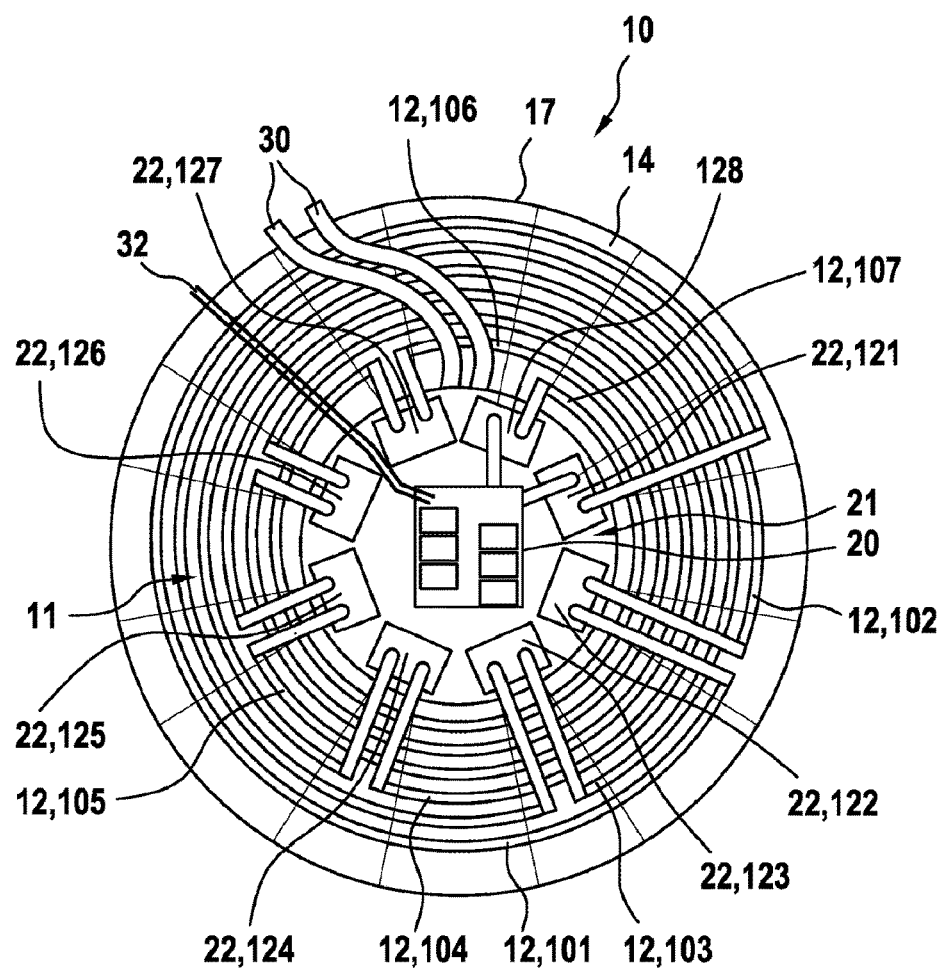
FIG. 3 shows a sectional illustration of a transmission coil according to the invention from above.

FIG. 3 shows the transmission coil 10 according to the invention in a schematic view from above.

FIG. 3 illustrates in transparent form the carrier 17 and the ferrite core 14, so that the interior of the transmission coil 10 can be seen. As can be inferred from the illustration in FIG. 3, the transmission coil 10 has a coil arrangement 11 which comprises a multiplicity of turns 12. The illustration in FIG. 3 contains seven turns which are denoted by the reference numbers 101, 102, 103, 104, 105, 106 and 107. Each of the turns 12 is assigned here at least one capacitor 22 as a capacitance, wherein the capacitors are denoted by the reference numbers 121, 122, 123, 124, 125, 126 and 127. In each case a capacitor 22 is connected in series here with a turn 12, with the result that an oscillatory circuit is formed. In this context, the first capacitor 121 is connected to the first turn 101. In addition, the individual oscillatory circuits are connected one behind the other in series, with the result that the end of the first turn 101 which is not connected to the first capacitor 121 is connected to the second capacitor 122. In this way, each turn 12 adjoins two capacitors 22, wherein for this purpose an eighth capacitor 128 is additionally arranged at the end of the last and seventh turn. The connection to power electronics 20 is produced via the first capacitor 121 and the eighth capacitor 128.

The coil arrangement 11 can be excited by means of the power electronics 20 if the transmission coil 10 is embodied as a primary transmission coil, and an alternating magnetic field is therefore generated. Additional external components are unnecessary, and a connection to the electrical power supply system must merely be established via an electrical terminal 32.

If the transmission coil 10 is embodied as a secondary transmission coil and if it is introduced into the alternating magnetic field of a primary transmission coil, the coil arrangement 11 is excited by means of magnetic induction and an electric current can be extracted by means of the power electronics 20. Said electric current can be made available via the electrical terminal 32, in order, for example, to re-charge a mobile energy store.

Both the power electronics 20 and the capacitors 22 can heat up during operation. In order to conduct away the heat, they are arranged on the carrier 17, which also serves as a heat sink. If pure air cooling is not sufficient, it is possible, as outlined in FIG. 3, to provide ducts 30 via which a cooling medium such as, for example, a water-glycol mixture can be fed in. The excess heat can be carried away by means of the cooling medium.

In a further embodiment (not illustrated), each individual turn 12 is not assigned a capacitor 22 but rather a plurality of turns 12, for example between two and ten turns 12, are combined to form a group of turns 12, wherein the entire group of turns 12 is assigned a capacitor 22.

In a further embodiment variant which is not illustrated in the figures, the oscillatory circuits, which are each formed from a turn 12 or a group of turns 12 and a capacitor 22, are not connected in series with one another but rather each connected directly to the power electronics 20. In such an embodiment, the power electronics 20 can actuate the individual turns 12 or individual groups of turns 12 separately. In this context, for example a single turn 12 or a group of turns 12 can be deactivated completely, or it would also be conceivable to excite the individual turns 12 or the oscillatory circuits, formed thereby, with different intensities. In this way, the alternating magnetic field which is generated by the coil arrangement 11 can be influenced selectively. This can be utilized to optimize the efficiency of the transmission of energy, in particular when the primary and secondary transmission coils which are used for transmitting energy are not embodied in an identical way or are not aligned with one another in an optimum way.

In further variants of the transmission coil 10 it is possible to accommodate more than one coil arrangement 11 on a carrier 17. In particular, two coil arrangements 11 can be arranged together on a carrier 17. In this context it is possible to connect the coil arrangements 11 in such a way that the turns 12 of the respective coil arrangements 11 are connected in the same direction as one another or in opposite directions.

The invention is not restricted to the exemplary embodiments described here or to the aspects emphasized herein. Instead, a multiplicity of modifications within the scope of the average ability of a person skilled in the art are possible within the range indicated by the claims.

The invention claimed is:

1. A transmission coil (10) which is configured to inductively transfer energy, comprising a carrier (17), a coil arrangement (11) with a multiplicity of turns (12), and a capacitance, characterized in that the capacitance is formed by a multiplicity of capacitors (22), wherein one of the capacitors (22) is assigned to an individual turn (12) and another of the capacitors is assigned to a group of at least two turns (12) of the coil arrangement (11), and the capacitors (22) are arranged, together with the coil arrangement, on the carrier (17).

2. The transmission coil (10) as claimed in claim 1, characterized in that, furthermore, power electronics (20), which comprise a power inverter and/or a rectifier, are arranged on the carrier (17).

3. The transmission coil (10) as claimed in claim 2, characterized in that the power electronics (20) are configured to deactivate or activate individual turns (12) or individual groups of turns (12).

4. The transmission coil (10) as claimed in claim 2, characterized in that the turns (12) of the coil arrangement (11) are arranged in the form of concentric circles, a spiral path or a rectangular path, and the power electronics are located in a central region (13) of the coil arrangement (11).

5. The transmission coil (10) as claimed in claim 1, characterized in that the carrier (17) is configured to serve as a shield for stray magnetic fields.

6. The transmission coil (10) as claimed in claim 1, characterized in that the carrier (17) is configured to serve as a heat sink for the capacitors (22), the coil arrangement (11), a ferrite core (14) and/or power electronics (20).

7. The transmission coil (10) as claimed in claim 1, characterized in that the carrier (17) comprises ducts (30) which are configured to have a cooling medium flowing therethrough.

8. A fixed charging station which is configured to inductively charge vehicles, comprising at least one transmission coil (10) embodied as a primary transmission coil, as claimed in claim 1.

9. A vehicle which is configured to charge inductively, comprising at least one transmission coil (10) which is embodied as a secondary transmission coil, as claimed in claim 1.

10. A system for inductively charging vehicles, comprising at least one primary transmission coil and at least one secondary transmission coil, wherein the transmission coils (10) are embodied as claimed in claim 1.

11. The transmission coil as claimed in claim 1, wherein the capacitors are located in a central region (13) of the coil arrangement (11) and are surrounded by the coil arrangement.

12. A transmission coil (10), comprising:
a carrier (17);
a ferrite core (14) disposed on one side of the carrier;
power electronics (20) disposed in a central region on another side of the carrier; and
a coil arrangement (11) arranged on the carrier,
wherein the carrier (17) is configured to serve as a heat sink for capacitors (22), the coil arrangement (11), the ferrite core (14) and the power electronics (20).

13. The transmission coil (10) as claimed in claim 12, characterized in that one of the capacitors (22) is assigned to an individual turn (12) and another of the capacitors is assigned to a group of at least two turns (12) of the coil arrangement (11).

14. The transmission coil (10) as claimed in claim 12, characterized in that the carrier (17) is configured to serve as a shield for stray magnetic fields.

15. The transmission coil (10) as claimed in claim 12, characterized in that the carrier (17) comprises ducts (30) which are configured to have a cooling medium flowing therethrough.

16. A transmission coil (10) configured to inductively transfer energy, comprising:
a carrier (17),
a coil arrangement (11) with a multiplicity of turns (12) arranged on the carrier (17), and
a capacitance formed by multiple capacitors (22) arranged on the carrier (17),
wherein at least one of the capacitors (22) is connected to at least two turns (12) of the coil arrangement (11).

17. The transmission coil as claimed in claim 16, wherein the capacitors are located in a central region (13) of the transmission coil (10) and are surrounded by the coil arrangement (11).

* * * * *